UNITED STATES PATENT OFFICE

ARTHUR ZITSCHER AND FRANZ MURIS, OF OFFENBACH-ON-THE-MAIN, GERMANY, ASSIGNORS TO GENERAL ANILINE WORKS, INC., OF NEW YORK, N. Y., A CORPORATION OF DELAWARE

PROCESS OF PRODUCING FAST PRINTINGS

No Drawing. Original application filed December 8, 1925, Serial No. 74,148. Patent No. 1,737,905, dated December 3, 1929, and in Germany December 25, 1924. Divided and this application filed April 29, 1929. Serial No. 359,168.

This application is a division from our application Serial No. 74,148, filed Dec. 8, 1925.

Our invention relates to a new process of producing fast printings consisting in fixing mixtures containing alkali metal salts of azo components adapted for producing azo dyestuffs on the fiber and salts of sulfnitrosaminic acids of the general formula:

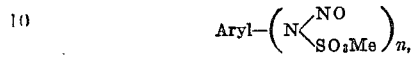

$n$ being a number less than three, and Me meaning an alkali metal, on the fiber and developing the dyestuffs in an appropriate manner by a treatment with an acid substance.

Our invention relates moreover to new printing pastes comprising an alkali metal salt of a coupling component suitable as developer in the art of producing azo dyestuffs on the fiber and a salt of a sulfnitrosaminic acid of the general formula:

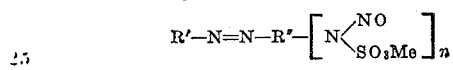

wherein R' and R'' represent aromatic radicals, Me means an alkali metal and $n$ stands for one of the numbers 1 and 2.

Such a development may be executed by treating the goods with acid vapors or by passing them in a bath containing a feeble acid, for instance a feeble organic acid such as formic acid, or by passing them in two baths the first of which contains an acid or an acid salt, the second bath contains salts of feeble acids, such as formates or acetates, or an alkali. The process is each time to be adapted to the character of the sulfnitrosaminic acid in question.

In this manner printings completely fast to washing are produced, the azo dyestuffs, thus formed, no longer containing the sulfonic group of the sulfnitrosaminic acids, which are their basis.

Regarding the well known instability of the sulfnitrosaminic salts, especially in the dry state—see Ber. d. Chem. Ges., vol. 28, page 3164, and vol. 30, pages 870, 874 and 880—it appears to be very surprising, that the sulfnitrosaminic salts, when mixed with the alkali metal salts of the azo-components can withstand the process of drying and steaming to an extent sufficient for obtaining useful and full dyeings.

The process may be carried out also without starting from salts of the finished sulfnitrosaminic acids, but by producing them on the fiber, for example a mixture of an alkali metal salt of an arylsulfaminic acid of the general formula:

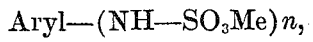

$n$ being a number less than three and Me meaning an alkali metal, and of alkali nitrite, which forms the corresponding sulfnitrosaminic acid by treating subsequently with an acid substance, together with an alkali salt of the azo component being used for printing.

Among the salts of sulfnitrosaminic acids of arylamines those of arylamines, having a substantive character, may be emphasized such as for example those of amino- or diamino compounds of the diaryl series or of the aromatic series, containing an azo-, azoxy-, urea-, thiazol-, imidazol-, pseudoazimino or a similar group. Especially valuable printings are obtained by using salts of sulfnitrosaminic acids of aminoazo bodies of the general formula:

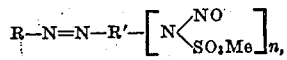

wherein R and R' mean aromatic residues and Me meaning an alkali metal, which may be substituted or not, and $n$ means a number less than 3.

As azo components adapted for producing azo dyestuffs on the fiber the naphthols and their derivatives may be named, such as $\beta$-naphthol and its derivatives, such as acylaminonaphthols, for example the benzoylaminonaphthols and the arylides of 2.3-hydroxynaphthoic acid, the derivatives of 1-hydroxynaphthalene-4-carboxylic acid, as described in U. S. A. Letters Patent No. 1,453,660 and bodies containing a methylene group capable of combining, for example the pyrazolone derivatives or derivatives of $\beta$-ketonaldehyde, such as the acylacetic acid arylides, the di- and monoacylacetoarylamines, as described in the French Letters Patent No. 567,284 and others.

The production of the sulfaminic acids and of their nitroso compounds respectively may be executed according to the process, as described in Ber. d. Deutschen Chem. Gesellschaft, vol. 28, page 3160 and vol. 30, page 880, and vol. 50, page 1117, respectively.

The new printing colors may be used for the multi-color printing besides the known nitrosamine printing colors.

The following examples illustrate the invention, the parts being by weight and all temperatures given being centigrades.

*Example 1*

21.5 grs. of the sodium salt of dehydrothiotoluidine-sulfaminic acid of the formula:

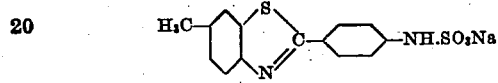

(of 80% strength), are dissolved in
150 grs. of hot water. After cooling down by adding
14.5 grs. of hydrochloric acid (d=1.160) the free sulfaminic acid is separated. By adding a solution
4 grs. of nitrite of sodium in
14 grs. of water the sulfnitrosaminic acid is formed. By pouring in
20 grs. of caustic soda solution (35° Bé.)

224 grs. of a paste are obtained.

225 grs. of this paste are worked up with
7.2 grs. of β-naphthol.
14.8 grs. of caustic soda solution (35° Bé.).
45 grs. of Turkey red oil,
208 grs. of water and
500 grs. of neutral starch tragacanth thickening to 1000 grs. of a printing paste.

The goods are printed, dried, steamed for 3 minutes, passed through a bath of 80° containing 20 grs. of acetic acid of 8° Bé. in the liter, rinsed, soaped, rinsed and dried.

A yellowish-red print is obtained.

*Example 2*

15 grs. of 5-nitro-2-anisidine-sulfaminic acid of the formula:

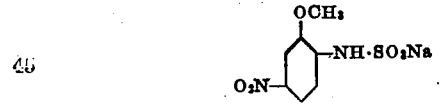

the sodium salt of 90% of strength, are dissolved in
142 grs. of hot water, after cooling down by adding
14.5 grs. of hydrochloric acid (d=1.160) the free sulfaminic acid is separated. By adding a solution of
4 grs. of nitrite of sodium in
15 grs. of water the sulfnitrosaminic acid is formed. By adding
19.5 grs. of caustic soda solution of 35° Bé, 210 grs. of a paste are obtained.

210 grs. of this paste are worked up with
15 grs. of α-naphthalide of 2-3-hydroxynaphthoic acid,
15 grs. of caustic soda solution of 35° Bé.,
260 grs. of water and
500 grs. of a neutral starch tragacanth thickening to 1000 grs. of a printing paste.

The cotton goods are printed, dried, steamed for 3 minutes in a rapid steam-apparatus at 100–105°, then passed through a cold bath, containing 200 grs. of hydrochloric acid (d=1.160) in the liter, rinsed and passed again at 50° through a bath containing 50 grs. of acetate of sodium in the liter, rinsed, soaped, rinsed again and dried.

In this manner a red like claret print is obtained.

*Example 3*

20.5 grs. of the sodium salt of meta-aminoazotoluene-sulfaminic acid of the formula:

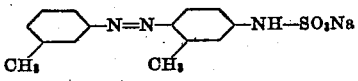

(of 80% of strength) are worked up with
15 grs. of meta-nitranilide of 2-3-hydroxynaphthoic acid
19.7 grs. of caustic soda solution of 35° Bé.,
3.8 grs. of nitrite of sodium,
45 grs. of Turkey red oil,
396 grs. of water and
500 grs. of a neutral starch tragacanth thickening to 1000 grs. of printing-paste.

The unprepared cotton goods are printed, dried, steamed for 3 minutes, passed through a hot bath of 90° containing 50 grs. of formic acid and 50 grs. of common salt in the liter, rinsed, soaped, rinsed again and dried.

A garnet-like print is obtained.

*Example 4*

84 grs. of a paste of 50% of strength of the salt of phenetolazo-1-naphthyl-sulfnitrosaminic acid of the formula:

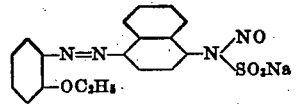

(prepared according to Ber. d. Deutsch. Chem. Ges. vol 28, page 3164, and vol. 50, page 1117, respectively) are worked up with
31 grs. of 2-3-hydroxynaphthoyl-meta-nitraniline,
50 grs. of Turkey-red oil,
30 grs. of caustic soda solution of 36° Bé.,
305 grs. of water and
500 grs. of a neutral starch tragacanth thickening to 1000 grs. of a printing paste.

The cotton goods are printed, dried, steamed for 5 minutes, then passed through a bath containing 50 grs. of hydrochloric acid of 22° Bé. in the liter, rinsed and subsequently passed through a bath, containing 8 grs. of caustic soda solution of 34° Bé. or a corresponding quantity of soda, then rinsed, soaped, rinsed again and dried.

A dark black print is obtained.

*Example 5*

47 grs. of the sodium salt of ortho-anisol-azo-1-naphthylsulfamic acid of the formula:

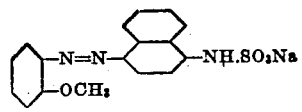

of 80% of strength are made up with
26.5 grs of the anilide of 2-3-hydroxynaphthoic acid,
10.5 grs. of nitrite of sodium,
50 grs. of Turkey-red oil,
30 grs. of caustic sodium solution of 36° Bé.,
336 grs. of water and
500 grs. of a neutral starch tragacanth thickening to 1000 grs.

The goods are printed, dried, steamed and passed through an acid and alkaline bath, as described in Example 4.

A reddish-black print is obtained.

Example 6

14.5 grs. of the sodium salt of meta-meta'-dichloro-benzidine-disulfaminic acid of the formula:

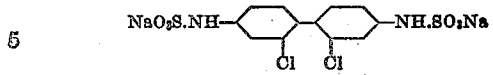

of 80% of strength are worked up with
- 15 grs. of meta-nitranilide of 2-3-hydroxynaphthoic acid
- 19.7 grs. of caustic soda solution of 35° Bé.,
- 3.8 grs. of nitrite of sodium,
- 45 grs. of Turkey-red oil,
- 402 grs. of water and
- 500 grs. of a neutral starch tragacanth thickening to 1000 grs. of a printing paste.

The unprepared cotton goods are printed, dried, steamed for 3 minutes and developed in a bath, as described in Example 3.

A bluish-red print is obtained.

Example 7

21.5 grs. of the sodium salt of dehydrothiotoluidine-sulfaminic acid of 80% of strength are worked up with
- 13 grs. of the anilide of 2-3-hydroxynaphthoic acid,
- 19.7 grs. of caustic soda solution of 35° Bé.,
- 3.8 grs. of nitrite of sodium,
- 45 grs. of Turkey-red oil,
- 397 grs. of water and
- 500 grs. of a neutral starch tragacanth thickening to 1000 grs. of a printing paste.

The cotton goods are printed, dried, steamed for 3 minutes, passed through a cold bath containing 50 grs. of sulfuric acid of 66° Bé. in the liter, rinsed and passed at about 50° through a bath containing 50 grs. of formate of sodium in the liter, rinsed, soaped, rinsed again and dried.

A red-like claret print is obtained.

Example 8

21.5 grs. of the sodium salt of dehydrothiotoluidine-sulfaminic acid of 80% of strength are worked up with
- 12.5 grs. of 4-hydroxynaphthylphenylketone,
- 20 grs. of caustic soda solution of 35° Bé.,
- 4 grs. of nitrite of sodium,
- 45 grs. of Turkey-red oil,
- 397 grs. of water and
- 500 grs. of a neutral starch tragacanth thickening to 1000 grs. of a printing paste.

The goods are printed, dried, steamed for 3 minutes, passed through a bath of 80° containing 20 grs. of acetic acid of 8° Bé. in the liter, rinsed, soaped, rinsed, and dried.

A bluish-red print is obtained.

By the same process a reddish yellow print is obtained, when mixing to the printing paste an equivalent quantity of diacetoacetyl-ortho-tolidine instead of 4-hydroxynaphthylphenylketone.

Example 9.—Two-color printing (a) Printing color for black:

- 49 grs. of the sodium salt of ortho-phenetol-azo-1-naphthylsulfaminic acid of 80% of strength are made up with
- 31 grs. of 2-3-hydroxynaphthoyl-meta-nitraniline,
- 10.5 grs. of nitrite of sodium,
- 50 grs. of Turkey-red oil,
- 30.5 grs. of caustic soda solution of 36° Bé.,
- 329 grs. of water and
- 500 grs. of a neutral starch tragacanth thickening to 1000 grs.

(b) Printing color for red:

- 120 grs. of a paste containing 15% of the anilide of 2-3-hydroxynaphthoic acid, a nitrosamine alkali metal salt of 3-nitro-1.4-toluidine and free caustic soda solution, are mixed with
- 40 grs. of Turkey-red oil,
- 100 grs. of a solution of a neutral chromate 1:4,
- 240 grs. of water and
- 500 grs. of a neutral starch tragacanth thickening to 1000 grs.

The goods are printed with the preceding colors, dried, steamed at 100° for 5 minutes with steam containing acetic acid, then passed broadly through a bath containing 30 grs. of sodium bisulfate in the liter, rinsed, subsequently passed through an alkaline bath and worked up in the usual manner.

A two-color print, a beautiful black besides red is obtained.

We claim:

1. In a process of producing fast printings the step comprising developing the dyestuff by reacting with an acidic substance upon a textile material impregnated with an alkali metal salt of a coupling compound suitable as developer in the art of producing azo dyestuffs on the fiber, and a salt of a sulfnitrosaminic acid of the general formula:

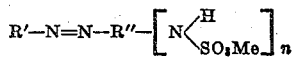

in which R' and R'' are aromatic radicals, Me means an alkali metal and $n$ a numeral less than 3.

2. In a process of producing fast printings the step comprising printing upon a textile material an alkali metal salt of a coupling compound suitable as developer in the art of producing azo dyestuffs on the fiber, and a salt of a sulfaminic acid of the general formula:

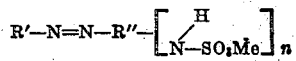

in which R' and R'' are aromatic radicals, Me means an alkali metal and $n$ a numeral less than 3, transforming the sulfaminic acid compound into the corresponding sulfnitrosaminic acid compound on the material and reacting with an acidic substance upon the so treated material.

3. In a process of producing fast printings the step comprising printing upon a textile material an alkali metal salt of a coupling compound suitable as developer in the art of producing azo dyestuffs on the fiber, an alkali metal nitrite, and a salt of a sulfaminic acid of the general formula:

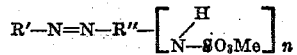

in which R' and R'' are aromatic radicals, Me means an alkali metal and $n$ a numeral less than 3, and reacting with an acidic substance upon the so treated material to produce the corresponding sulfnitrosaminic acid compound and to develop the dyestuff.

4. In a process of producing fast printings the step comprising developing the dyestuff by reacting with an acidic substance upon a textile material impregnated with an alkali metal salt of a 2.3-hydroxynaphthoic acid arylide, and a salt of a sulfnitrosaminic acid of the general formula:

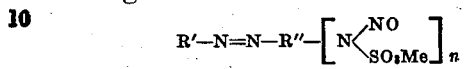

in which R' and R'' are aromatic radicals, Me means an alkali metal and $n$ a numeral less than 3.

5. In a process of producing fast printings the step comprising printing upon a textile material an alkali metal salt of a 2.3-hydroxynaphthoic acid arylide, and a salt of a sulfaminic acid of the general formula:

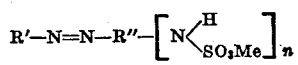

in which R' and R'' are aromatic radicals, Me means an alkali metal and $n$ a numeral less than 3, transforming the sulfaminic acid compound into the corresponding sulfnitrosaminic acid compound on the material and reacting with an acidic substance upon the so treated material.

6. In a process of producing fast printings the step comprising printing upon a textile material an alkali metal salt of a 2.3-hydroxynaphthoic acid arylide, an alkali metal nitrite and a salt of a sulfaminic acid of the general formula:

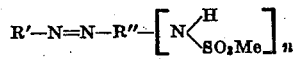

in which R' and R'' are aromatic radicals, Me means an alkali metal and $n$ a numeral less than 3, and reacting with an acidic substance upon the so treated material to produce the corresponding sulfnitrosaminic acid compound and to develop the dyestuff.

7. In a process of producing fast printings the step comprising developing the dyestuff by reacting with an acidic substance upon a textile material impregnated with an alkali metal salt of 2.3-hydroxynaphthoic-meta nitranilide and a salt of phenetol-azo-1-naphthyl-sulfnitrosaminic acid.

8. As new compositions of matter printing pastes comprising an alkali metal salt of a coupling component suitable as developer in the art of producing azo dyestuffs on the fiber and a salt of a sulfnitrosaminic acid of the general formula:

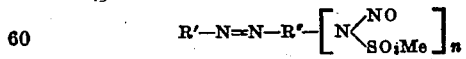

wherein R' and R'' represent aromatic radicals, Me means an alkali metal and $n$ stands for one of the numbers 1 and 2.

9. As new compositions of matter printing pastes comprising an alkali metal salt of a 2.3-hydroxynaphthoic acid arylide and a salt of a sulfnitrosaminic acid of the general formula:

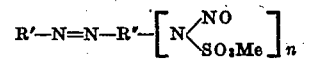

wherein R' and R'' represent aromatic radicals, Me means alkali metal and $n$ stands for one of the numbers 1 and 2.

10. As new compositions of matter printing pastes comprising an alkali metal salt of a coupling component suitable as developer in the art of producing azo dyestuffs on the fiber, an alkali metal nitrite and a salt of a sulfaminic acid of the general formula:

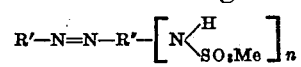

wherein R' and R'' represent aromatic radicals, Me means an alkali metal and $n$ stands for one of the numbers 1 and 2.

11. As new compositions of matter printing pastes comprising an alkali metal salt of a 2.3-hydroxynaphthoic acid arylide, an alkali metal nitrite and a salt of a sulfaminic acid of the general formula:

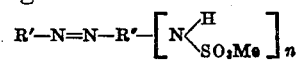

wherein R' and R'' represent aromatic radicals, Me means an alkali metal and $n$ stands for one of the numbers 1 and 2.

12. As a new composition of matter a printing paste containing about 31 parts of 2.3-hydroxynaphthoic acid meta-nitranilide, about 30 parts of caustic soda solution of 36° Bé., about 84 parts of a paste of 50% strength of the sodium salt of phenetol-azo-1-naphthyl-sulfnitrosaminic acid, about 50 parts of Turkey-red oil, about 50 parts of water and about 500 parts of neutral starch tragacanth thickening.

In testimony whereof we affix our signatures.

ARTHUR ZITSCHER.
FRANZ MURIS.